United States Patent [19]

Honjo et al.

[11] 4,110,607
[45] Aug. 29, 1978

[54] SYSTEM FOR DETECTING HEIGHT FLUCTUATIONS OF A SURFACE ON A RECORDING MEDIUM IN AN OPTICAL RECORDING OR REPRODUCING APPARATUS

[75] Inventors: Yoshihiko Honjo, Ayase; Junji Kuroda, Zama, both of Japan

[73] Assignee: Victor Company of Japan, Ltd., Yokohama, Japan

[21] Appl. No.: 753,005

[22] Filed: Dec. 21, 1976

[30] Foreign Application Priority Data

Dec. 22, 1975 [JP] Japan .................. 50-151999
Dec. 22, 1975 [JP] Japan .................. 50-171975[U]

[51] Int. Cl.$^2$ .............................................. G01J 1/20
[52] U.S. Cl. ........................... 250/201; 179/100.3 V; 358/128
[58] Field of Search ................ 179/100.3 V; 250/201; 358/128

[56] References Cited

U.S. PATENT DOCUMENTS

| 3,716,845 | 2/1973 | Chaffin | 179/100.3 V X |
| 3,932,700 | 1/1976 | Snopko | 250/201 X |
| 4,044,378 | 8/1977 | Laub | 250/201 X |

OTHER PUBLICATIONS

Frosch et al., "Optical Surface Microtopography Measurement and/or Automatic Focussing", *IBM Technical Disclosure Bulletin;* pp. 504, 505, Jul. 1972.

*Primary Examiner*—Lawrence J. Dahl

[57] ABSTRACT

The invention relates to a system for detecting the height fluctuations of a surface on a recording medium in an optical recording or reproducing apparatus. A light source emits a main light beam for recording or reproducing. An optical system, including an objective lens, focuses the main light beam into a spot on the surface. A first reflecting mirror introduces a sublight beam into the peripheral part of the main light beam. The sub-light beam advances in a forward path through the objective lens to be projected onto the recording surface and reflected thereby. The sub-beam returns again through the objective lens along the peripheral part of the main light beam, but on the opposite side from said forward path. A second reflecting mirror extracts the sub-light beam in the return path out of the light to operate a detector which detects fluctuations in the distance between the objective lens and the recording surface and to produce control signals maintaining a constant distance between the objective lens and recording surface.

8 Claims, 10 Drawing Figures

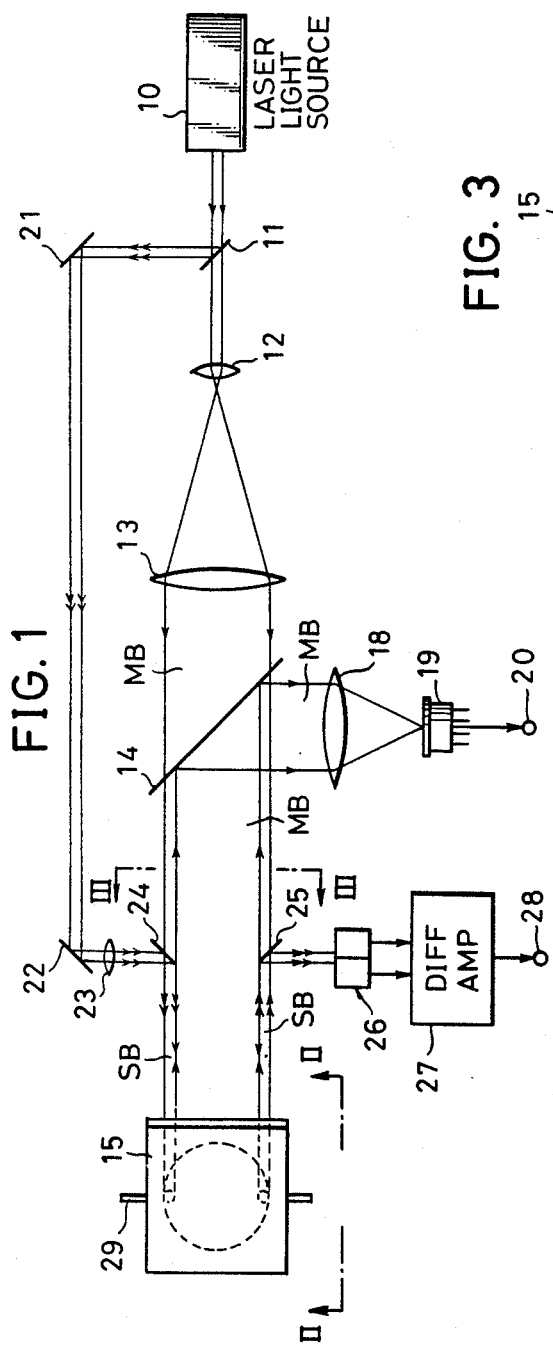
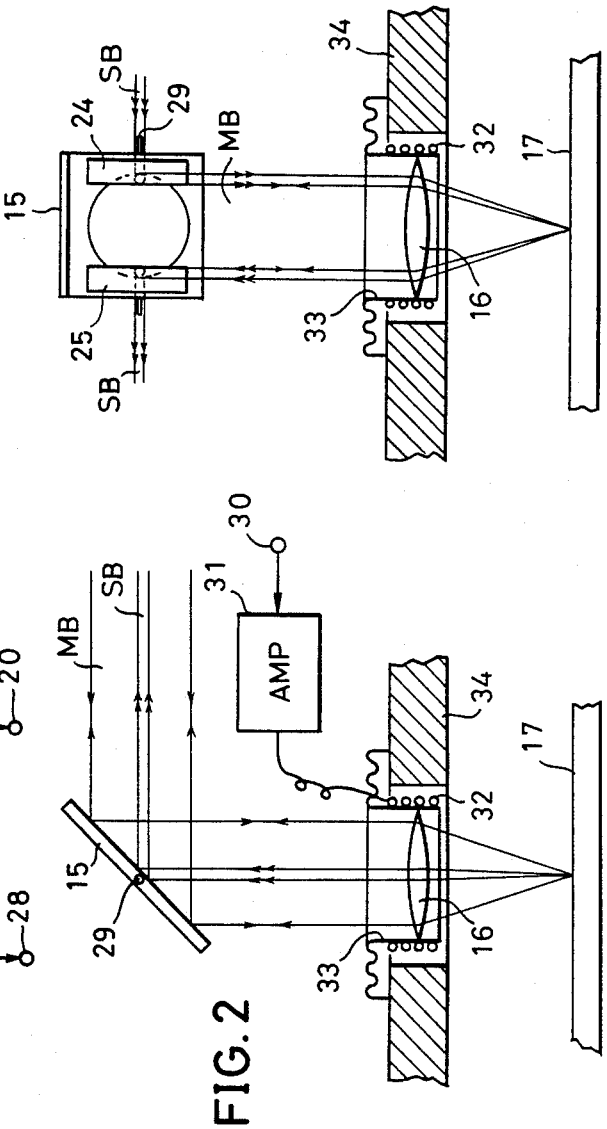

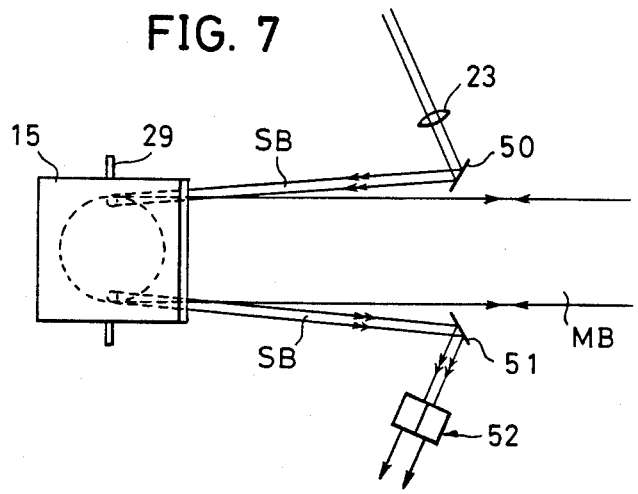
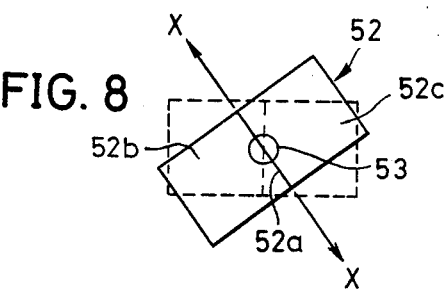
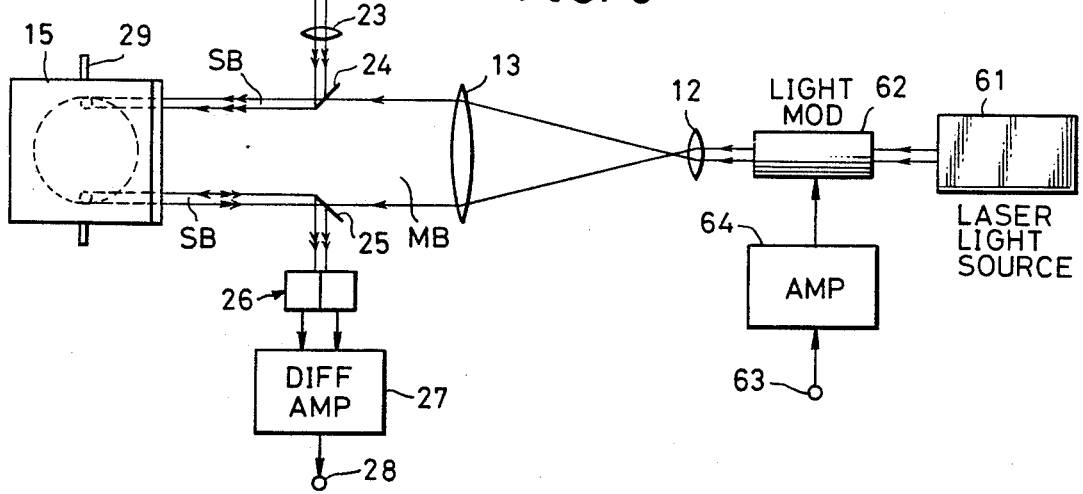

SYSTEM FOR DETECTING HEIGHT FLUCTUATIONS OF A SURFACE ON A RECORDING MEDIUM IN AN OPTICAL RECORDING OR REPRODUCING APPARATUS

BACKGROUND OF THE INVENTION

The present invention relates generally to systems for detecting fluctuations of height positions of the recording medium surface used in an optical recording and reproducing apparatus. More particularly, the invention uses a sub-light beam which is introduced into a peripheral part of a laser light beam used for recording or reproducing. The peripheral part contributes almost nothing to the recording or reproducing, per se, but it does enable a detection of the height fluctuations of a surface on the recording medium.

In general, in an optical recording or reproducing apparatus, an objective lens focuses a laser light beam into a spot on the surface of a recording medium. In order to form a very small spot on the recording medium surface, a very small numerical aperture lens is used for the objective lens. The depth of field of focus decreases with an increasing of the numerical aperture. Consequently, the depth of field of a lens used for the above mentioned objective lens is very shallow.

A displacement or fluctuation may occur in the height position of the surface on a rotating recording medium because it is warped and non-flat. Thus, the distance between the objective lens and the recording medium surface fluctuates. However, the depth of field of an objective lens used in an optical recording or reproducing apparatus of this character is particularly shallow. For this reason, if the distance between the objective lens and the recording medium surface fluctuates, even by a slight amount, the diameter of the spot of the laser beam focused on the recording medium surface will fluctuate greatly. In this case, it is often difficult or impossible to have optical recording or reproducing with a good signal-to-noise ratio and high fidelity. Accordingly, it is necessary to positively and accurately hold a constant distance between the objective lens and the recording medium surface.

Heretofore, an optical recording or reproducing apparatus of this character has detected a height position displacement of the recording medium surface and controlled the height position of the objective lens in response thereto, in order to maintain a constant distance between the objective lens and the recording medium surface. This control system is generally referred to as the "focus-servo" system.

The light path of a laser light beam for recording or reproducing is hereinafter called a "main beam", and a light beam for detecting the surface height is hereinafter called a "sub-beam".

A conventional system for detecting the height of the recording medium surface in a known focus-servo system comprises means for projecting, from outside the main beam, and sub-beam having a diameter which is in the same order as the diameter of the main beam. The sub-beam is projected into the objective lens in a slightly oblique direction. The sub-beam is thus reflected by the recording medium so that it passes again through the objective lens, and is directed out of the light path of the main beam by a half mirror. In this system, however, the sub-beam has had beam diameter which is in the same order as the diameter of the main beam. Moreover, the deviation of the sub-beam optical axis is only slight relative to the main beam optical axis. For these reasons, the half mirror is disposed in a position to transverse the entire light path of the main beam.

Consequently, the half mirror, in this known detection system, causes a high loss of light signal strength in the main beam. The rate of light utilization of the main beam decreases.

In another known detection system, a sub-beam is projected from outside the path of the main beam in a slightly oblique direction. The sub-beam is reflected by the recording medium and is again directed into the same light path that was followed by the incident sub-beam, the sub-beam thus returning being detected. In this method, however, it is difficult to cause the sub-beam to follow exactly the same light path in both the forward (incident) path and the return (reflection) path. The adjustment and setting of the detection device is very difficult. As a result, it almost impossible to reduce this system to practice.

SUMMARY OF THE INVENTION

Accordingly, it is an object of the present invention to provide a novel and useful system for detecting the height fluctuations of a recording medium surface used in an optical recording or reproducing apparatus, in which the inventive system overcomes the above described difficulties.

Another and specific object of the invention is to provide a laser light beam system in which a sub-beam is projected into a peripheral part of the main beam. The sub-beam contributes almost nothing to the recording or reproducing responsive to the laser light of the main beam for recording or reproducing. The displacements in the position of the recording medium surface are detected by this sub-beam. In accordance with the present invention, there is substantially no lowering in the rate of utilization of the light used for recording or reproducing of the main beam. Moreover, it is easy to set the light path of the sub-beam. Still another object of the invention is to provide a system for detecting the positional displacements of a recording medium surface, in which the projecting and extracting of the sub-beam into and out of the main beam light path can be easily accomplished.

Further objects and features of the invention will be apparent from the following detailed description with respect to preferred embodiments of the invention when read in conjunction with the accompanying drawings briefly described below.

BRIEF DESCRIPTION OF THE DRAWINGS

In the drawings:

FIG. 1 is a schematic plan view showing one embodiment of a detection system of the invention, applied to an optical reproducing apparatus;

FIG. 2 is a side elevation of the one embodiment of FIG. 1, with a part shown in vertical cross section, FIG. 2 being a view taken from the line II—II (FIG. 1), looking in the arrow direction;

FIG. 3 is an elevation, with a part in vertical section, as viewed from the line III—III in the arrow direction in FIG. 1;

FIG. 7 is a partial schematic plan view showing of a third embodiment of the detection system of the invention;

FIG. 8 is an axial view of a light detector; and

FIG. 9 is a schematic plan view showing a fourth embodiment of the detection system of the invention, applied to an optical recording apparatus.

DETAILED DESCRIPTION

Figure 4:
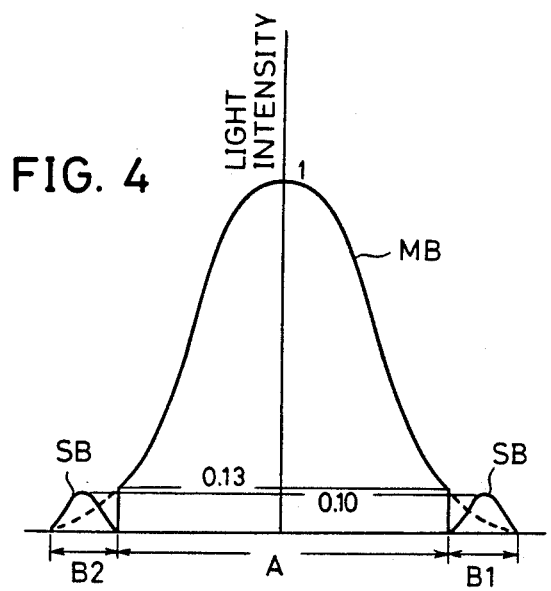
FIG. 4 is a graph indicating the distribution of light intensity of a main beam and a sub-beam.

In the first embodiment of the detection system of the invention (FIGS. 1, 2 and 3), a laser light beam is projected from a helium-neon laser light source 10, for example. The beam passes through a half-mirror 11 and then is converted into a large diameter parallel-ray beam, by lenses 12 and 13. These lenses 12 and 13 are a beam expandor, which expands a small diameter beam into a large diameter. The laser light beam, for reproducing, which has thus passed through the lens 13 is hereinafter referred to as "main beam MB". It passes through a half-mirror 14 and is then reflected by a reflecting mirror 15 (FIGS. 1-3), in an advancing path direction, which is changed as indicated in FIGS. 2 and 3. The main beam MB, thus reflected, is focused into a spot on the surface of a recording disc 17, by an objective lens 16. As is known, pits are formed in the surface of the recording disc 17 in conformance with an information signal carried by the main beam.

The main beam MB is reflected from the recording disc 17 and again passes through the objective lens 16, but in the reverse direction. From there it is reflected by the half-mirror, mirror 15 (FIGS. 1-3), through a lens 18 (FIG. 1), and to a light detector 19. The light reflected by the recording disc 17 (FIGS. 2 and 3) has an intensity which varies in response to the configuration of the pits formed in the recording disc surface, in response to the previously recorded information signal. Responsive to this light variation, i.e., to the recorded information signal, an electrical signal is obtained from the light detector 19. The resulting signal is then supplied through a terminal 20 to a reproducing circuit, from which a reproduced information signal is obtained.

On one hand, one portion of the laser light beam from the light source 10 is reflected by the half-mirror 11 and is thus led out of the light path of the main laser light beam. This light beam is utilized as a detection sub-beam SB laser light beam. This sub-beam is reflected by reflecting mirror 21 and 22 and, converted by a lens 23 into a very slightly diffused light beam. The resulting beam is reflected by mirror 24 and introduced into the path of the main beam MB.

The transverse distribution of light intensity in the parallel-ray laser light main beam, passes through lens 13, is described a Gaussian curve, as indicated in FIG. 4. An important feature of this light intensity distribution is that there is a very low intensity of the light in the curve skirt, indentified by broken lines, that is, the peripheral part of the main beam. This low intensity periphery contributes almost nothing to information reproduction.

In accordance with the present invention, the mirror 24 is installed to reflect only this peripheral part of the main beam light path as shown in FIGS. 1 and 3. The sub-beam SB reflected by the mirror 24 advances parallel to the main beam, along a region corresponding to the peripheral part thereof. From there, the sub-beam is reflected by the mirror 15 through the objective lens 16, and is reflected by the surface of the recording disc 17. In this operation, the sub-beam SB is projected onto the recording disc 17 in a manner which will not be affected by the information pits formed in the recording disc surface, for example, with a large diameter of 5 $\mu$m. The reflected sub-beam SB again passes through the objective lens 16, but in the opposite direction, as indicated in FIG. 3. From there, the sub-beam passes through a return path in a region corresponding to and on the diametrically opposite side of the peripheral part of the main beam, as compared to the sub-beam advancing in its forward path, i.e., toward the recording disc 17. The sub-beam is reflected by the mirror 15. This sub-beam SB is further reflected by a reflecting mirror 25 installed in the peripheral part of the main beam light path on the side thereof opposite from the mirror 24, and on to a light detector 26.

The reflecting mirror 15 is mounted on a shaft 29, so that it can be rotated slightly for tracking control, as known in the prior art. The mirrors 24 and 25 are disposed at symmetrical positions on opposite sides of the optical axis of the main beam. These symmetrical positions cause the sub-beam to be reflected by the mirror 15 along the centerline axis of the rotatable shaft 29. By this positioning of the mirrors 24 and 25, a slight rotation of the mirror 15 on the shaft 29, for the purpose of tracking control, will cause almost no variation in the light path of the sub-beam SB reflected by the mirror 15. For this reason, a detection of the positional displacement of the recording disc 17 can be carried out accurately, irrespective of the tracking control.

In this specific embodiment, the diameter of the main beam transmitted through the lens 13 is from 6 to 7 mm, and the spacing between the mirrors 24 and 25 is set at 5 mm. In the light intensity distribution indicated in FIG. 4, the sub-beam SB is inserted in positions corresponding to the skirt parts of the light intensity curve. The values of the sub-beam are less than thirteen percent, for example, of the maximum luminous intensity of the main beam MB. Accordingly, in FIG. 4, the high intensity zone A of the main beam MB is used for reproduction. The low intensity zones B1 and B2 are utilized by the sub-beam SB for detection. The maximum light intensity of the sub-beam SB is in the order of ten percent of the maximum light intensity of the main beam MB.

In this connection, the zones B1 and B2 are cut off by the mirror 24 and 25 and utilized for the sub-beam SB. Hence, the loss of light intensity from the main beam MB occurs in only these zones. However, since there is only a low light intensity of the main beam MB in these zones, they have almost no contribution to the actual optical reproduction, and no problems arise in practice.

The light detector 26 is a differential type comprising a photodiode having a pair of detection surfaces. When the distance between the objective lens 16 and the surface of the recording disc 17 is the optimal distance, the sub-beam SB reflected by the recording disc 17 and reflected by the mirrors 15 and 25 is projected as incident light into the light detector 26. The center of this sub-beam SB is in register with the boundary between the pair of detection surfaces. In this case, the detection surfaces of the light detector 26 receive equal quantities of light. The resulting pair of output signals from the light detector 26 are supplied to a differential amplifier 27, which thereupon produces an output control signal responsive to the difference between these outputs. An output control signal thus generated, appears at an output terminal 28. Since the pair of output signals from the light detector 26 are equal for an optimum surface height, no control signal is sent through the terminal 28.

If the height of the recording surface of the recording disc 17 fluctuates as it rotates, because of an irregularity such as a warping or other non-flat character, the distance between the objective lens 16 and the surface of the recording disc 17 fluctuates. The diameter of the sub-beam SB entering as incident light into the light detector 26 changes, and, at the same time, its center is displaced. In this case, the quantities of light received by the two detection surfaces of the light detector 26 are no longer equal. A control signal appears responsive to the difference and is sent through the output terminal 28.

A control signal thus generated is applied from terminal 28 through a terminal 30 to an amplifier 31 and a coil 32. This coil 32 is wound around the outer periphery of a bobbin 33 holding the objective lens 16 and is disposed within the field of magnet 34. Responsive to a control signal current, this coil 32 undergoes a vertical displacement in the magnetic field. As a consequence, the height position of the objective lens 16 is controlled. Thus, the distance between the objective lens 16 and the recording disc 17 is controlled so that it is continually maintained at a constant and regular value, responsive to the control signal.

If the main beam MB is a parallel-ray beam, a diffused light is used for the sub-beam SB. If the main beam MB is a diffused light, either a parallel-ray light or a diffused light is used for the sub-beam SB.

Figure 5A:
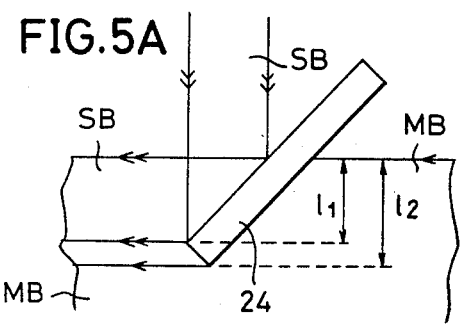
FIGS. 5A and 5B are enlarged, fragmentary plan views respectively showing reflecting means for beams for detection.

Next to be considered is the loss of light from the main beam MB, due to the mirror 24 and 25. In general, a reflecting mirror has a certain thickness. Consequently, when the mirror 24 is positioned in the peripheral part of the main beam MB, as shown in FIG. 5A, for example, the distance l1 can be used for the sub-beam SB, but the main beam MB is reduced in transverse width by the distance l2. As a result, there is a waste of light which occurs in the part (l2 - l1).

Figure 5B:
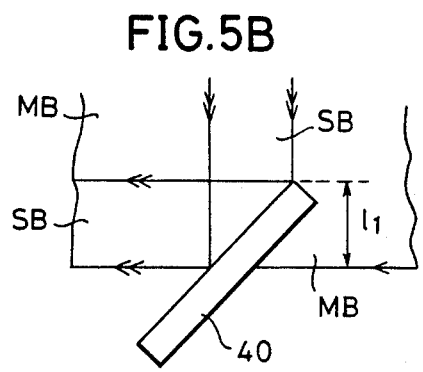

Accordingly, as shown in FIG. 5B, a reflecting mirror 40, performing a function corresponding to that of the reflecting mirror 24, is inserted into the peripheral part of the main beam MB as illustrated in the figure. By this arrangement, the loss of light from the main beam MB due to the mirror, is only the distance l1. This part of the distance l1 is utilized for the sub-beam SB. In this case, however, the sub-beam SB projected as incident light onto the mirror 40 is introduced by traversing across the main beam MB.

Figure 6:
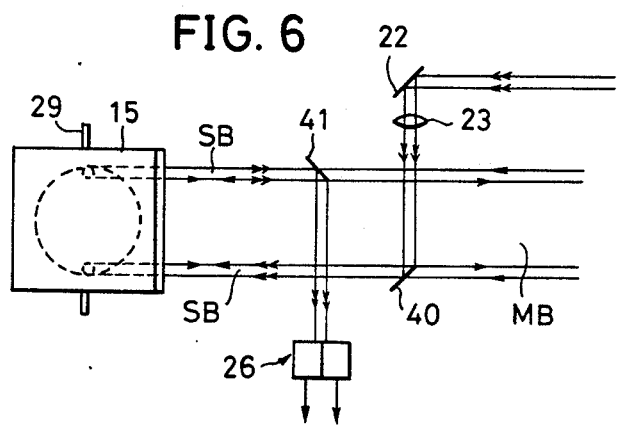
FIG. 6 is a partial schematic plan view of a second embodiment of the detection system of the invention.

FIG. 6 shows an essential part of a second embodiment of the invention using the above described arrangement of the mirror. In FIG. 6, those parts which are the same as corresponding parts in FIG. 1 are designated by like reference numerals. Description of such parts will be omitted.

Reflecting mirrors 40 and 41 are disposed in the peripheral part of the main beam, but at positions on opposite sides, relative to the mirrors 24 and 25 shown in FIG. 1. The sub-beam SB from the lens 23 traverses the main beam MB and is projected onto the mirror 40, from which it is reflected. On the other hand, the sub-beam SB from the mirror 15 is reflected by the mirror 41, traverses the main beam MB, and reaches the light detector 26.

For the reasons explained above in respect to the mirror 40, the mirror 41 is not wasteful of light. in the main beam MB, although there is a loss of light due to the sub-beam SB.

A third embodiment detection system, according to the invention, will now be described with reference to FIGS. 7 and 8. In this embodiment, reflecting mirrors are used for a sub-beam to prevent the loss of light from the main beam. More specifically, mirrors 50 and 51 are disposed at positions which are slightly offset outwardly from the light path of the main beam MB. By this arrangement, the mirrors 50 and 51 cannot impart a loss of light to the main beam MB. The sub-beam SB is reflected by the mirror 50, as incident light, to the mirror 15 at the axial centerline of the rotatable shaft 29. The sub-beam SB reflected by the recording disc and the mirror 15 is reflected by the mirror 51 and enters, as incident light, into the light detector 52.

In this detection system, the light axis of the sub-beam SB is not parallel to the light axis of the main beam MB. For this reason, a spot 53 of the sub-beam SB moves along the arrow line X—X on the detection surface of the light detector 52 when the mirror 15 is rotated by tracking control. This movement occurs even when the distance between the objective lens and the recording disc is being maintained at the regularly preset value. Accordingly, the light detector 52 is orientated with an inclination from the horizontal state, indicated by broken line, so that the boundary line 52a between its pair of detection surface 52b, 52c coindides with the line X—X.

FIG. 9 shows a fourth embodiment of the detection system of the invention, applied to an optical recording apparatus. In FIG. 9, those parts which are the same as corresponding parts in FIG. 1 are designated by like reference numerals. Description of such parts will be omitted.

A recording laser light beam is emitted from an argon laser light source 61 and is modulated by a light modulator 62 in response to an information signal applied to the light modulator 62 by way of a terminal 63 and an amplifier 64. The resulting main recording beam MB from the light modulator 62 passes through the lenses 12 and 13. After being reflected by the lens 15, it passes through the objective lens and is focused as a spot on the recording disc.

On the other hand, a helium-neon laser light source 65 emits a laser beam, for detection as a sub-beam SB. The sub-beam passes through the lens 23, is reflected by the mirror 24, and, then passes through the same light path as in the preceding first embodiment, until it reaches the light detector 26.

The recording disc is coated over its recording surface with a photo-resist which is photosensitive to argon laser light of a wavelength of 4579 Å and not to helium-neon laser light of a wavelength of 6328 Å. For this reason, recording is accomplished by an argon laser light beam. The detection of the height position fluctuations of the recording disc surface is carried out effectively and accurately without any deleterious effect on the recording operation, responsive to the helium-neon laser light beam.

In each of the above described embodiments of the invention, the forward path and the return path of the sub-beam SB are different. For this reason, the positions of reflecting mirrors 24 (40, 50) and 25 (41, 51) can be adjusted in a mutual independent manner. Thus adjustments of the light paths are greatly facilitated.

Further, this invention is not limited to these embodiments but variations and modifications may be made without departing from the scope and spirit of the invention.

What is claimed is:

1. A system for detecting height fluctuations of a recording surface in an optical recording or reproducing apparatus,
   said recording or reproducing apparatus comprising a light source means for emitting a main light beam for recording or reproducing, an optical system means including an objective lens for focusing said main light beam in a spot on said surface, and control means responsive to control signals for maintaining a constant distance between said objective lens and said recording surface,
   said detection system comprising:
   means for producing a sub-light beam;
   means for introducing said sub-light beam into a peripheral part of said main light beam at one position in the light path thereof, said sub-light beam thus introduced advancing in a forward path through said objective lens to said recording surface to be reflected thereby and returning in a return path through said objective lens and along another peripheral part of said main light beam which is opposite to said one position;
   means for extracting said sub-light beam passing through said return path from the light path of said main light beam; and
   light detection means having a pair of light detecting surfaces with a common boundary line therebetween to receive said extracted sub-light beam, said light detection means responding to a deviation of the center of said extracted sub-light beam on the light detecting surfaces to a point away from the boundary line for detecting fluctuations in said distance between said objective lens and said recording surface and for producing said control signals responsive thereto.

2. A detection system as claimed in claim 1 in which said means for introducing the sub-light beam comprises a first reflecting mirror disposed in a first position within the peripheral part in the light path of said main light beam, and said means for extracting the sub-light beam comprises a second reflecting mirror disposed in a second position in the peripheral part of and diametrically opposed to said first position in the light path of said main light beam.

3. A detection system as claimed in claim 1 in which said optical system means has a mirror for reflecting said main light beam and sub-light beam, thereby changing the light path directions, means for rotatably adjusting the reflecting mirror through small angles about a rotatable shaft, and said forward and return paths of the sub-light beam being oriented so that the sub-light beam in said forward path and the sub-light beam in said return path are reflected by said reflecting mirror at positions corresponding to the axial centerline of said rotatable shaft.

4. A detection system as claimed in claim 2 and means for disposing said first mirror in a position which reflects the sub-light beam after it has entered as incident light and traversed said light path of the main light beam, said first mirror directing said sub-light beam along said forward path in the peripheral part of the main light beam, and said second mirror means being disposed in a position which reflects the sub-light beam in said return path to traverse the light path of the main light beam, to be projected onto said detection means.

5. A detection system as claimed in claim 3 in which: said means for introducing the sub-light beam comprises a first reflecting mirror disposed outside of the light path of the main light beam; said means for extracting the sub-light beam comprises a second reflecting mirror disposed outside of the light path of the main light beam; said detection means further includes means for projecting the sub-light beam reflected by said second mirror onto said pair of light detecting surfaces; and means whereby said light detector is orientated with said boundary line coinciding with the direction of displacement of the sub-light beam responsive to the rotation of said reflecting mirror.

6. A detection system as claimed in claim 1 in which said forward path and said return path of the sub-light beam are disposed in regions of the light path of the main light beam where the light intensity of the main light beam is less than approximately thirteen percent of the maximum light intensity, as measured in the transverse distribution of the light in the main light beam.

7. A system for detecting height fluctuations of a recording surface in an optical reproducing apparatus,
   said reproducing apparatus comprising light source means for emitting a main light beam, an optical system means including an objective lens for focusing said main light beam into a spot on said surface, and control means responsive to control signals for maintaining a constant distance between said objective lens and said recording surface,
   said detection system comprising:
   means for extracting a portion of the light beam emitted from the light source means in order to make use of it as the light beam for detection;
   means for introducing a sub-light beam into a peripheral part of said main light beam at one position in the light path. said introduced sub-light beam advancing in a forward path through said objective lens to be projected onto said recording surface and reflected thereby along a return path through said objective lens and a peripheral part of said main light beam which is on the side opposite said one position;
   means for extracting said sub-light beam passing through said return path from the light path of said main light beam; and
   light detection means having a pair of light detecting surfaces with a common boundary line therebetween to receive said extracted sub-light beam, said light detection means responding to a deviation of the center of said extracted sub-light beam on the light detecting surfaces to a point away from the boundary line for detecting fluctuations in said distance between said objective lens and said recording surface and for producing said control signals in response thereto.

8. A system for detecting height fluctuations of a recording surface in an optical recording apparatus,
   said recording apparatus comprising a first light source means for emitting a main light beam having a first wave length, an optical system means including an objective lens for focusing said main light beam in a spot on said surface, said control means responsive to control signals for maintaining a constant distance between said objective lens and said recording surface,
   said detection system comprising:

a second light source means for emitting a sub-light beam of a second wave length which is different from the first wave length;

means for introducing said sub-light beam into one position in the peripheral part of said main light beam, said sub-light beam advancing in a forward path through said objective lens to said recording surface from which it is reflected in a return path through said objective lens and along said peripheral part of said main light beam on a side opposite to said one position;

means for extracting said sub-light beam passing through said return path from the path of said main light beam; and light detection means having a pair of light detecting surfaces with a common boundary line therebetween to receive said extracted sub-light beam, said light detection means operating in response to a deviation of the center of said extracted sub-light beam on the light detecting surfaces to a point away from the boundary line for detecting fluctuations in said distance between said objective lens and said recording surface and for producing said control signals in response to said fluctuations.

* * * * *